United States Patent [19]

Caspar et al.

[11] Patent Number: 4,695,223
[45] Date of Patent: Sep. 22, 1987

[54] TURBOMOLECULAR VACUUM PUMP WITH A ROTOR AND AT LEAST ONE ANTIFRICTION BEARING

[75] Inventors: Hans-Peter Caspar, Troisdorf; Günter Schütz, Cologne, both of Fed. Rep. of Germany

[73] Assignee: Leybold-Heraeus GmbH, Cologne, Fed. Rep. of Germany

[21] Appl. No.: 844,460

[22] Filed: Mar. 26, 1986

[30] Foreign Application Priority Data

Apr. 4, 1985 [EP] European Pat. Off. ........ 85104096.4

[51] Int. Cl.$^4$ ............................................. F04D 29/04
[52] U.S. Cl. ..................................... 415/90; 415/109; 415/111; 415/180; 384/476; 384/489; 384/900
[58] Field of Search ................. 415/90, 109, 110, 111, 415/175, 177, 180; 384/478, 476, 489, 900

[56] References Cited

U.S. PATENT DOCUMENTS

| 1,864,027 | 6/1932 | Pederson | 415/180 X |
| 2,830,755 | 4/1958 | Anderson | 415/175 |
| 2,841,455 | 7/1958 | Perrier | 384/476 |
| 2,854,296 | 9/1958 | Eberle | 384/476 |
| 3,975,113 | 8/1976 | Ogles | 415/175 X |
| 4,579,508 | 4/1986 | Tsumaki et al. | 415/90 |

FOREIGN PATENT DOCUMENTS

| 58-81269 | 5/1983 | Japan | 384/489 |
| 2155563 | 9/1985 | United Kingdom | 384/489 |

Primary Examiner—Robert E. Garrett
Assistant Examiner—Joseph M. Pitko
Attorney, Agent, or Firm—Felfe & Lynch

[57] ABSTRACT

The invention relates to a turbomolecular vacuum pump (1) with a rotor (6) and at least one antifriction bearing (17) for the rotor, the stationary ring (19) of the antifriction bearing being seated on the wall of a sleeve (21) which in turn is supported through at least two O-rings (26, 27) made from an elastic material on a casing section (13) of the pump. To improve the heat flow from the sleeve (21) to the casing (13) of the pump, the annular space (29) formed by two seal rings (26, 27), the sleeve (21) and the pump casing (13) is filled with a medium (31) promoting heat flow from the sleeve to the adjacent part of the casing.

16 Claims, 3 Drawing Figures

TURBOMOLECULAR VACUUM PUMP WITH A ROTOR AND AT LEAST ONE ANTIFRICTION BEARING

The invention relates to a turbomolecular vacuum pump with a rotor and at least one antifriction bearing for the rotor, the stationary ring of the antifriction bearing being seated against the wall of a sleeve which in turn is supported through at least two O-rings made from an elastic material on a casing section of the pump.

It is known to supply antifriction bearings of a turbomolecular pump with lubricating oil which is conducted to the bearings through a central channel in the rotor shaft. (Published German patent application DOS No. 22 63 612.) The lower end of the shaft projects into a lubricant space and is constructed as a centrifugal pump. The oil, which is fed to the bearings in a closed loop, not only has the function of lubricating the bearings but also serves to carry off the heat generated in the area of the bearings. A drawback of this prior-art turbomolecular pump is that it can only be used in the vertical position.

To overcome this drawback and to attain higher rotational speeds, turbomolecular vacuum pumps are already being equipped with grease-lubricated antifriction bearings. Spindle bearings which are supported on the casing of the pump by means of an outer sleeve through O-rings made from an elastic material (published German patent application DOS No. 30 39 196) have proved particularly advantageous. The special advantage of this arrangement is that the transmission of vibrations from the bearings to the casing is strongly damped and the problems of supercritical operation therefore are greatly reduced. However, the solution described has the drawback that the O-rings, made from a material having poor thermal conductivity, impede the removal of the heat.

The object of the present invention is to provide a turbomolecular vacuum pump of the type mentioned at the outset in which the transfer of heat from the bearing to the pump casing is not impeded despite the presence of O-ring damping.

In accordance with the invention, this object is accomplished in that the annular space formed by two seal rings, the sleeve and the pump casing is filled with a material promoting heat flow from the sleeve to the adjacent casing section. Such materials are, for example, corrugated, relatively thin and therefore flexible sheet-metal packings, or metal wool made from copper or bronze, for example. Particularly appropriate, however, are liquid and/or gaseous mediums. These offer the advantage that they possess good thermal conductivity and therefore transfer the heat but not the vibrations of the bearing sleeve to the casing of the turbomolecular vacuum pump. Dense gases (for example, $SF_6$) or also oils are particularly well suited. In many cases, it is sufficient to have the clearance space fromed by the seal rings, the bearing sleeve and the pump casing communicate with the atmosphere so that it contains air under atmospheric pressure.

Further advantages and details of the invention will now be explained with reference to embodiments illustrated in FIGS. 1 to 3.

Figure 1:
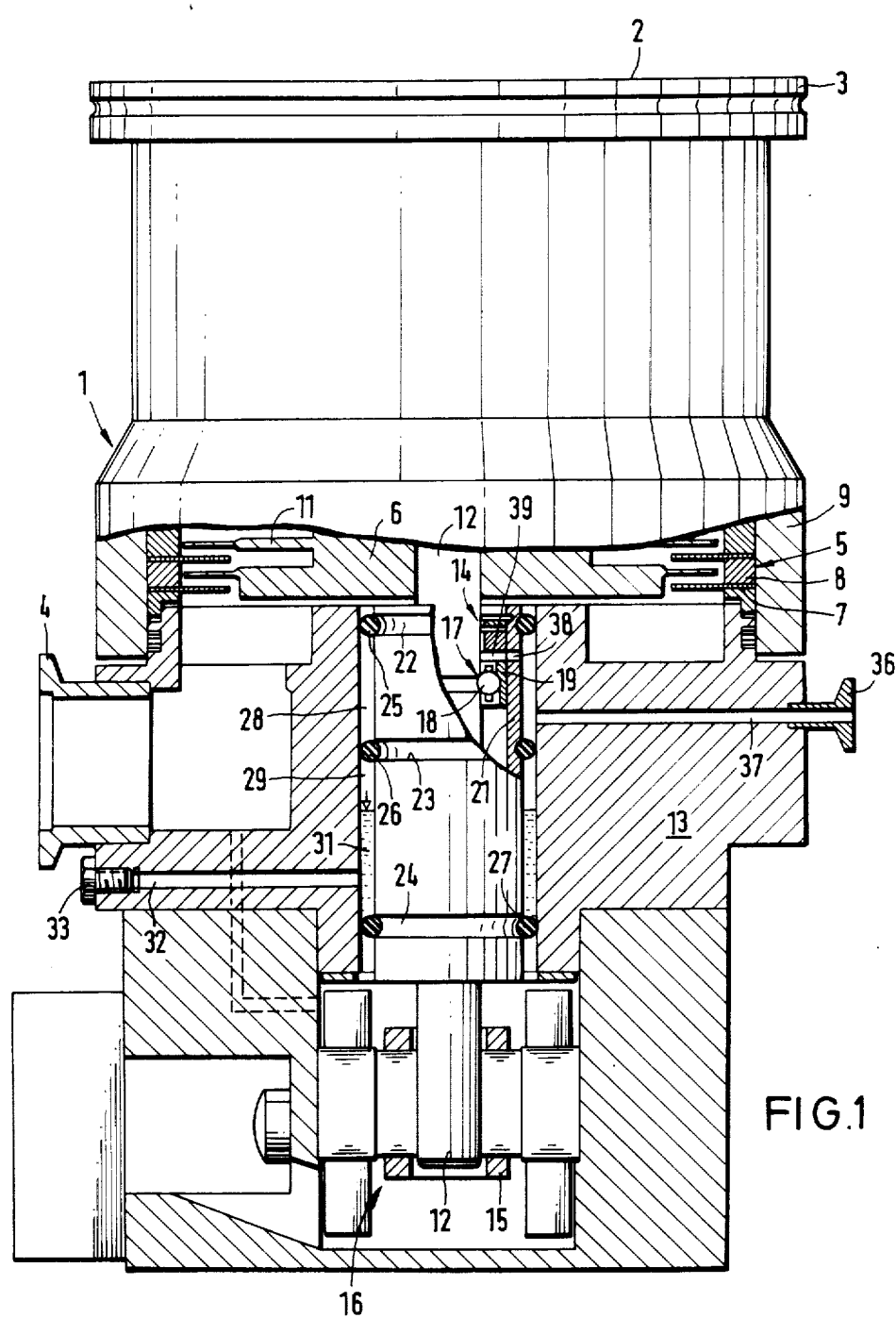
FIG. 1 is a fragmentary side view of the turbomolecular vacuum pump with the antifriction bearing of the present invention.

In the turbomolecular vacuum pump 1 shown, the inlet is designated 2, the inlet flange 3 and the outlet pipe stub 4. The stator 5 and the rotor 6 are only shown partly. The stator 5 consists of stator blade rings 7 between which spacer rings 8 are disposed. The system formed by the blade rings 7 and the spacer rings 8 is held together by the substantially cylindrical casing portion 9. In the embodiment shown diagrammatically in FIG. 2, these details are not illustrated separately.

Figure 2:
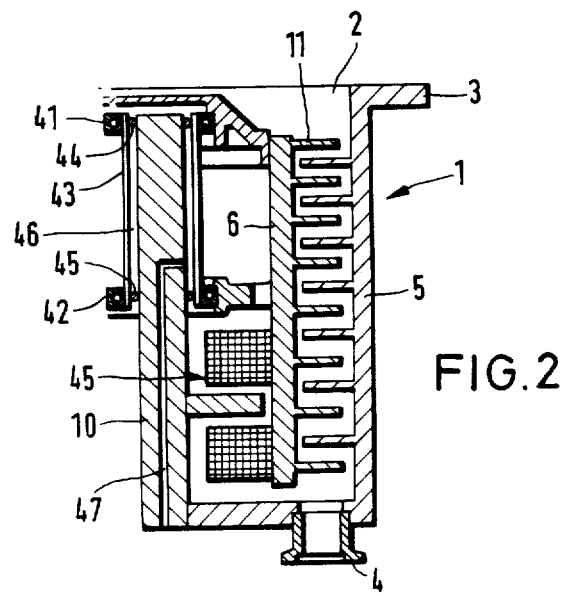
FIG. 2 shows an alternate embodiment of the present invention.
Figure 3:
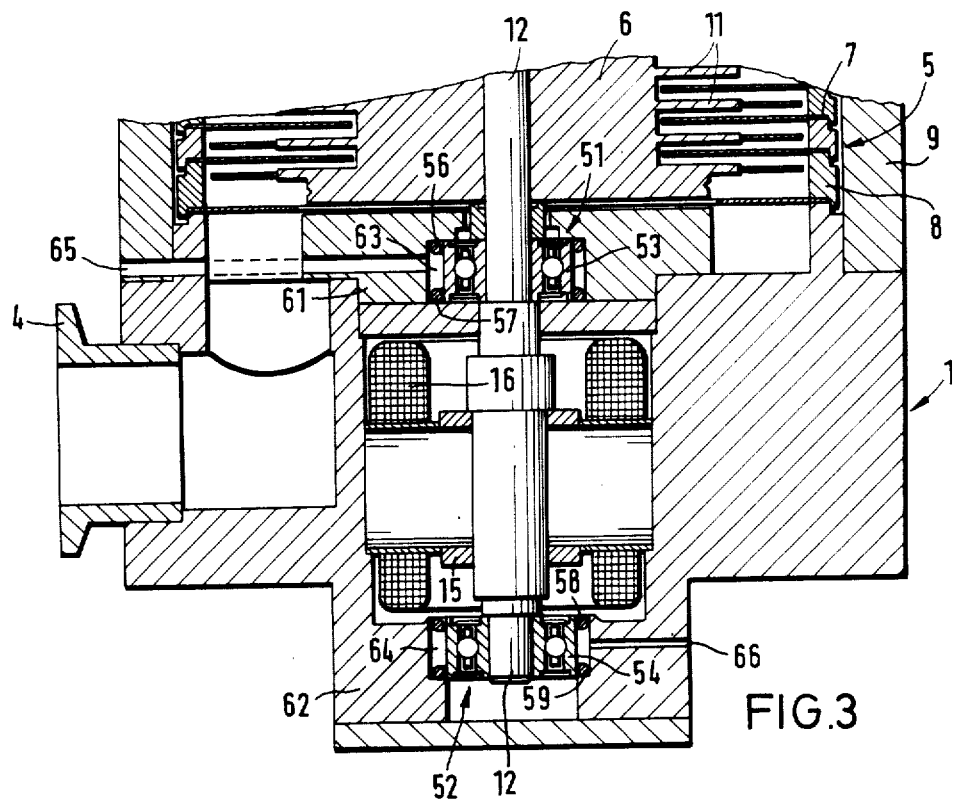
FIG. 3 shows a further embodiment of the present invention.

In the embodiment of FIGS. 1 and 3, the rotor 6 is integral with its blades 11 and mounted on the shaft 12. In the embodiment of FIG. 2, the rotor is supported on a central stationary trunnion 10.

In the embodiment of FIG. 1, the shaft 12 is supported in the casing section 13 of the turbomolecular vacuum pump by means of a spindle bearing 14. Mounted on the lower end of the shaft 12 is the armature 15 of the drive motor 16.

The spindle bearing 14 is disclosed in published German patent application DOS No. 30 39 196. It comprises two rolling-element bearings 17 (of which only one is visible) whose rolling elements 18 roll directly on the shaft 12. The stationary bearing ring 19 is seated on the inside wall of a sleeve 21. On its outside, the sleeve 21 is provided with three annular grooves 22, 23 and 24 for the seal rings 25, 26 and 27. The spindle bearing 14 is supported in the casing section 13 of the turbomolecular vacuum pump in such a way, by means of the seal rings inserted in the grooves, that two annular spaces 28 and 29 are created. In the embodiment shown, the annular space 29 is partly filled with a liquid 31 (for example, oil). Filling is done through the duct 32, through which the annular space 29 communicates with the environment, and whose outer port is adapted to be closed by means of the screw 33. The liquid 31 serves to transfer the heat from the sleeve 21 to the casing section 13, thus preventing excessive heating especially of the rolling-element bearings 17.

In the embodiment of FIG. 1, a total of three seal rings 25, 26 and 27 is provided so that there are two annular spaces 28 and 29. The annular space 28 serves as an annular inlet duct for a barrier gas. The latter has the function of maintaining a pressure above the upper rolling-element bearing 17 that is somewhat higher than the forepressure prevailing in the bearing space and in the motor space. Maintaining a barrier-gas flow makes it possible to prevent lubricant vapors from getting to the rough-vacuum side of the turbomolecular vacuum pump. The barrier gas is fed to the annular space 28 through the flange 36 and the bore 37. Above the upper rolling-element bearing 17, the sleeve 21 and the stationary bearing ring 19 are provided with a bore 38 and 39, respectively. Through these bores the barrier gas flows to the delivery side of the roughing pump and is pumped off by the roughing pump connected to the flange 4.

The embodiment shown in FIG. 2 is a turbomolecular vacuum pump in which the rotor 6 is supported through the bearings 41 and 42, the sleeve 43 and the seal rings 44 and 45 on a stationary trunnion 10. The rotor 6 is driven by the external-rotor motor 45. To obtain largely unimpeded heat transfer from the sleeve 43 to the stationary trunnion 10, which forms part of the casing of the turbomolecular vacuum pump 1, the annular space 46 formed by the trunnion 10, the seal rings 44 and 45 and the sleeve 43 communicates through the duct 47 with the surrounding atmosphere.

In the embodiment of FIG. 3, the shaft 12 is supported in two separate antifriction bearings 51 and 52, disposed above and below, respectively, the drive motor 15 and 16. The stationary bearing rings 53 and 54 form at the same time the sleeve, each being supported through two seal rings 56, 57 and 58, 59, respectively, in the respective parts 61 and 62 of the casing. Annular spaces 63 and 64 are thus formed which through bores 65 and 66 communicate with the atmosphere. As a result, the annular spaces contain air under atmospheric pressure that assures the transfer of heat from the bearings to the parts of the casing which are adjacent.

Through the invention, unimpeded heat transfer from the bearings to the casing of the turbomolecular pump is obtained despite the presence of damping by the use of seal rings made from a material having poor thermal conductivity. For further dissipation of the heat, the casing of the turbomolecular vacuum pump itself may be cooled in addition, for example, by means of a water- or air-cooling system.

We claim:

1. A turbomolecular vacuum pump comprising a rotor and at least one antifriction bearing for said rotor wherein said rotor contains a stationary ring, and a sleeve with a wall against which said stationary ring is seated, said sleeve supported on a casing section of said pump by a plurality of O-rings which consist of elastic material, wherein said sleeve, said casing, and said O-ring form at least one annular space which is filled with a medium which promotes heat flow from the sleeve to the adjacent part of the casing.

2. A turbomolecular vacuum pump according to claim 1, wherein said sleeve is supported by two O-rings.

3. A turbomolecular vacuum pump according to claim 2, wherein said annular space is filled with a packing of corrugated metal sheets or of metal wool.

4. A turbomolecular vacuum pump according to claim 13, wherein said annular space is open to the atmosphere.

5. A turbomolecular vacuum pump according to claim 1, wherein said medium comprises at least one liquid or gas.

6. A turbomolecular vacuum pump according to claim 5, wherein said medium is liquid.

7. A turbomoleculear vacuum pump according to claim 6, wherein said liquid is oil.

8. a turbomolecular vacuum pump according to claim 5, wherein said medium is gas.

9. A turbomolecular vacuum pump according to claim 8, wherein said gas is $SF_6$.

10. A turbomolecular space according to claim 1, wherein said sleeve is supported in said casing through three O-rings to form two annular spaces one of said annular spaces containing a medium which promotes flow and the second serving as a barrier gas inlet duct.

11. A turbomolecular vacuum pump according to claim 10, wherein said second annular space is disposed in proximity to said bearing on the rotor side and communicates with a rough-vacuum space of said pump.

12. A turbomolecular vacuum pump according to claim 10, wherein said inlet duct empties into the side of said bearing remote from the rotor into the annular space.

13. A turbomolecular pump as in claim 1, wherein said sleeve and said stationary bearing ring are the same component.

14. A turbomolecular pump as in claim 1, wherein said pump is equipped with a cooling system.

15. A turbomolecular pump as in claim 14, wherein said cooling system is a water cooling system.

16. A turbomolecular pump as in claim 14, wherein said cooling system is an air cooling system.

* * * * *

UNITED STATES PATENT AND TRADEMARK OFFICE
CERTIFICATE OF CORRECTION

PATENT NO. : 4,695,223
DATED : September 22, 1987
INVENTOR(S) : Hans-Peter Caspar, et al.

It is certified that error appears in the above-identified patent and that said Letters Patent is hereby corrected as shown below:

Claim 4, line 2: change "13" to -- 2 --.

Claim 10, line 4: after "promotes" insert -- heat --.

Signed and Sealed this

Twenty-eighth Day of June, 1988

Attest:

DONALD J. QUIGG

Attesting Officer

Commissioner of Patents and Trademarks